(12) United States Patent
Conover et al.

(10) Patent No.: US 7,329,185 B2
(45) Date of Patent: Feb. 12, 2008

(54) UNIVERSAL COMP BANK AND REGIONAL SERVERS FOR USE IN MULTI-PROPERTY CASINO ENTERPRISE

(75) Inventors: Robert G. Conover, Summers Point, NJ (US); Gregory D. Larsen, Sun Valley, NV (US); George D. Paiva, Reno, NV (US)

(73) Assignee: Harrah's Operating Company, Inc., Las Vegas, NV (US)

( * ) Notice: Subject to any disclaimer, the term of this patent is extended or adjusted under 35 U.S.C. 154(b) by 527 days.

(21) Appl. No.: 10/419,679

(22) Filed: Apr. 21, 2003

(65) Prior Publication Data

US 2004/0209674 A1 Oct. 21, 2004

(51) Int. Cl.
*A63F 9/24* (2006.01)

(52) U.S. Cl. ...................................................... 463/25
(58) Field of Classification Search ................ 463/25, 463/29, 42; 705/63, 68, 77, 14, 16
See application file for complete search history.

(56) References Cited

U.S. PATENT DOCUMENTS

| | | | |
|---|---|---|---|
| 5,613,912 A | 3/1997 | Slater | |
| 5,761,647 A * | 6/1998 | Boushy | ........................ 705/10 |
| 5,766,075 A | 6/1998 | Cook et al. | |
| 5,809,482 A | 9/1998 | Strisower | |
| 5,974,135 A | 10/1999 | Breneman et al. | |
| 6,003,013 A | 12/1999 | Boushy et al. | |
| 6,183,362 B1 * | 2/2001 | Boushy | ........................ 463/25 |
| 6,302,793 B1 | 10/2001 | Fertitta, III et al. | |
| 6,511,377 B1 * | 1/2003 | Weiss | ........................ 463/25 |
| 2003/0069071 A1 * | 4/2003 | Britt et al. | ..................... 463/42 |

(Continued)

FOREIGN PATENT DOCUMENTS

EP 1351180 A2 * 10/2003

OTHER PUBLICATIONS

"Trillium Software, Bringing Your Customers Into View," printout of brochure from Trillium Software web site: http://www.trilliumsoft.com, copyright © 2000 Trillium Software System, a division of Harte-Hanks, Billerica, Massachusetts; original posting date: unknown; web page printout date: Apr. 25, 2002, 8 pages.

(Continued)

*Primary Examiner*—Robert E. Pezzuto
(74) *Attorney, Agent, or Firm*—Fenwick & West LLP

(57) ABSTRACT

A multi-property comp bank allows comp points to be earned and redeemed in an aggregated manner at a plurality of affiliated casino properties. The comp bank includes a first bank account of comp points for each casino patron having a balance that is visible to the patron, accessible by the patron, and directly redeemable by the patron, and a second bank account of comp points having a balance that is invisible to the patron, accessible only by authorized casino employees, and redeemable on a discretionary basis only by authorized casino employees. Each award of comp points is apportioned between the patron's first and second bank accounts according to a predetermined ratio. The comp points in the first bank account can be aggregated across properties and redeemed at any property, whereas the comp points in the second bank account can be redeemed only at the property where they were earned.

6 Claims, 12 Drawing Sheets

U.S. PATENT DOCUMENTS

2004/0254010 A1* 12/2004 Fine .......................... 463/25

OTHER PUBLICATIONS

"The Trillium Software System, Trillium's Converter, Parser, Geocoder, and Matcher," printout from Trillium Software web site: http://www.trilliumsoft.com/site/content/how/_fits.asp, Trillium Software, a division of Harte-Hanks, Billerica, Massachusetts; original posting date: unknown; web page printout date: Apr. 25, 2002. 2 pages.

"The Trillium Software Architecture Summary," printout from Trillium Software web site: http://www.trilliumsoft.com, Trillium Software, a division of Harte-Hanks, Billerica, Massachusetts; original posting date: unknown; web page printout date: Apr. 25, 2002. 5 pages.

"A Practical Guide to Achieving Enterprise Data Quality," printout of article from Trillium Software web site: http://www.trilliumsoft.com, Trillium Software, a division of Harte-Hanks, Billerica, Massachusetts; article copyright © 1998 by The Applied Technologies Group, Natick, Massachusetts, original posting date: unknown; web page printout date: Apr. 25, 2002, 22 pages.

"Trillium Software System Version 5.0: Enterprise Energy Edition," printout of brochure posted on Trillium Software web site: http://www.trilliumsoft.com, Trillium Software, a division of Harte-Hanks, Billerica, Massachusetts; original posting date: unknown; web page printout date: Apr. 25, 2002. 2 pages.

"Customer-Centric Data Management—The Missing Quality Factor," printout of White Paper (TRIL0300) posted on Trillium Software web site: http://www.trilliumsoft.com, copyright © 2001, Trillium Software, a division of Harte-Hanks, Billerica, Massachusetts; original posting date: unknown; web page printout date: Apr. 25, 2002. 21 pages.

Bally Gaming Systems—SDS products from Bally Gaming Systems web site, original posting date: unknown; web page printout date: Apr. 30, 2002, 2 pages.

Aristocrat Technology Inc. Corporate Jobs Outlook, printout from Plunkett Research, Ltd. web site, original posting date: unknown; web page printout date: Apr. 30, 2002, 2 pages.

Las Vegas Slot Clubs News, article from Las Vegas Review-Journal, Jan. 11, 2002, printout from website: http://www.slot-machine-games.net/las_vegas_slot_clubs.html; web page printout date: Nov. 3, 2002, 2 pages.

"Park Place Connection: Unified Rewards Program Delivers More Power to The Player," Park Place Entertainment, New Release, Jan. 3, 2002, printout from web site: http://investor.parkplace.com/news/20020103-68650.cfm?Category=General%20News%20Releases; web page printout date: Mar. 24, 2002, 2 pages.

The One Club, Mandalay Resort Group, printout from web sites: http://www.myoneclub.com/? and http://www.myoneclub.com/pop_about.php, printout date: Mar. 25, 2003, 2 pages.

Mandalay Introduces Multi-Casino Slot Card, Casino City Newsletter: Issue 62, vol. 1, p. 1, Nov. 13-19, 2001, printout from web site: http://newsletter.casinocity.com/Issue 62/, printout date: Mar. 25, 2003, 2 pages.

MGM Mirage Players Club, printout from web site: https:/www.playersclub.com/portal and https:/www.playersclub.portal?act=faq, printout date: Mar. 25, 2003, 3 pages.

MGM Mirage expands gambler's card program, Las Vegas Sun, Jul. 11, 2002, printout from web site: http://www.lasvegassun.com/sunbin/stories/text/2002/jul/11/513698437.html, printout date: Mar. 25, 2003, 2 pages.

Compton, J. Players Club Spotlight—Megaclub updated, Casino Player, copyright © 2003, CPG, publication date/first posting date unknown, printout from web site: http://www.casinoplayer.com/archive/0210cp/pc_spotlight.html, printout date: Mar. 25, 2003, 4 pages.

Station Casinos modify Boarding Pass program, Player's Edge column, Las Vegas Review-Journal, Feb. 9, 2001, printout from web site: http://www.lvrj.com/lvrj_home/2001/Feb-09-Fri-2001/weekly/15395312.html, printout date: Mar. 25, 2003, 3 pages.

* cited by examiner

PATRON IDENTITY SERVER 18

| UID | LOCAL ACCOUNT NUMBER | PATRON IDENTIFYING INFORMATION | CASINO PROPERTY |
|---|---|---|---|
| U1111 | 1234 | Dr. John Smith<br>444 Main St.<br>Madison, WI 53710<br>Tel. (608) 266-0001 | 1,2 |
| U1112 | 1667 | Jane Caplin<br>33 S. Broad St.<br>Albany, NY 12207<br>(518) 434-1217 | 2 |
| U1113 | 1889 | Lane Bryan<br>12 Cottonwood Lane<br>Austin, TX, 78750<br>512-335-4321 | 1 |
|  | 0437 | L. Bryan<br>Zip: 78750<br>(no other information provided) | 2 |
| U1114 | 0766 | Terry Fuller<br>444 Oak Lane<br>Cheltenham, PA 19012<br>(no phone number provided) | 1 |
|  | 3344 | Terry Fuller<br>1011 Hilltop Dr.<br>Cheltenham, PA 19012<br>215-635-3332 | 1 |
|  | 4467 | Terry Fuller<br>215-635-3332 | 2 |

*Figure 2*

REGION 1 PATRON COMP BANK

| Patron's local account number | Patron visible, cross-property earned/redeemable comp points (Bank A or Bucket A) | | | Patron invisible comp points (Bank B or Bucket B) | | |
|---|---|---|---|---|---|---|
| | Property $Rl_1$ | Property ... $Rl_2$ | Property $Rl_n$ | Property $Rl_1$ | Property ... $Rl_2$ | Property $Rl_n$ |
| 1234 | 20 | 40 | | 10 | 20 | |
| 1889 | 0 | 0 | | 10 | 0 | |
| 0437 | 20 | 0 | | 0 | 0 | |
| . . . . | | | | | | |
| n | | | | | | |

*Figure 3*

```
CFWRS010              ADD NEW RESERVATION              9/18/02    9:23 AM

NAME   : DOE, JOHN                DOB  :   0/00/00
SPOUSE :                          ACCT#: 101 6640678
                                  OFFICE:
ADDRESS OKAY    Any Town, NV 89015
R-BUCKET       $542   B-BUCKET    $35  Observed:       $0

Comp Status  _  (Y,N,D,O)                Print Code ....

Arrival Dt:  09 / 18 / 02  Time ....: 00 A  # Nts .....  Seat With: N  (Y/N)
Departure Dt: 00 / 00 / 00  Time ....: 00 A
Compor ID #  .......  Requestor  ..............
Revenue Ctr  .....  # Comped  .....  # Pty  .....
Amount  ..........      Incentive Comp  N  (Y/N)
# Rooms  ...  Room Type?  .....  Comp/Rate  ..........  Block  ..........
Comments: 1 ...................................  2 ...................................
          3 ...................................  4 ...................................

CF1-EXIT  CF8-REV CENTERS
```

*Figure 4A*

Example 1
Add New
Reservation
Screen

```
        ACCT# 101 6640678              ENTER COMP SLIP           9/18/02   9:19 AM
DOE, JOHN                                OFFICE                  CFWRS200
Any Town, NV 89015
DOB BANK A:         $542   BANK B:                $35   OBSERVED:         0
COMP    REVENUE        NUMBER    COMPOR       COMP                COMP    PRINT
STATUS  CENTER         COVERS    ID#          AMOUNT              SLIP#   CODE
                                                                  00000000
 ]

COMMENTS ...... $ .... TOTAL COMP VALUE/09:19A

NEXT # 101 .......         REVENUE CENTER CODES

A   AIRFARE          B   STEAKHOUSE         BB  BILLBACK          C   AL DENTE
CH  CHARTER AIR      CP  PD @ CAGE          D   CHANG'S           DP  DU PARC-BAR
DS  DISCOUNT         E   CELEBRITY ROOM     ET  EIFF TOWER REST   F   INDIGO ROOM
FT  FIGHT TICKETS    G   SEASONS            GF  GOLF              GU  GUSTAV CAS BAR
H   MAIN SNACK BAR   I   CASINO BAR         J   BUBBLES BAR       JJ  JEAN JACQUES
K   COFFEE SHOP   BC KP  LE CAF PARIS PC L  LIMO                  LC  LA CHINE REST
LE  P-CABARET BAR    LL  P-LOBBY LOUNGE     LP  PARIS LIMO        LR  ROTISSERIE RO
                                                                              More....

CF1-MENU  CF3-RTNGS
```

Example 2
Enter Comp Slip
Screen

*Figure 4B*

```
GM1G    9/17/2002 Ballys/Paris Las Vegas    LMTRNDTA14    11:22:19    GINFO
CMD
AR  92002 Fri DP  92202 Sun      A/C  2                   RP RACK      GP CBCAS02 RB
STATUS N  NONGTD ACT   C/S            HH                        FF            CO
WG TYPE ROOM#          RATE A/C
BB AK           999.00   2               OVRID            NET N  PRT N LAST DOE       FIRST JOHN                              TITLE      GTYP CA
COMPANY                       ATTN                                TYP H/B H
ADR1/2 123 Main Street        NO MAIL ADDRESS
CITY Any Town       STATE/PROV NV  ZIP 89015    COUNTRY            LNG
PHONE                  X
        GUEST CREDIT INFORMATION
                                   VIP    PC    SRC CA  RSN      NRG     PRM HST N
STL MTH CA  NBR                 GROUP B/C         EXP    AUTH
CRDT LMT      10.00  CHECK LMT          .00             CONF# BKMXM
DEP REQ AMT      .00  O/R   REQ DATE                    POST#
DEP REC AMT       .00         REC DATE                  CNCL#
ADV CODE         X-C/O N  TAX EXEMPT N  REF                       CRID
CAS# 101 6640678          GRP B/C O/R               STR/DT           END/DT ACTIVE FUNCTION KEYS    13  14  15  16  17  18 19 20  21 22 23 24       F21=Fun Key Desc
                     1   2   3   4   5   6  7  8   9 10 11 12
```

Example 3
Reservation
Change Screen

*Figure 4C*

```
CFWRS010              SELECT RESERVATION SCREEN              9/17/02      8:38 AM

NAME  : DOE, JOHN                      DOB  :     0/00/00
  SPOUSE :                                ACCT# : 101 6640678
                                          OFFICE :
  ADDRESS OKAY
  Any Town, NV 89015
 A-BUCKET        $542  B-BUCKET        $35  Observed:        $0
 SEL REVENUE CENTER   DATE     TIME   CS  PS   PC   AMOUNT   SLIP#
  )  CHANG'S         9/17/02  8:34 A  Y                25   1893296

Enter an X under SEL to select a reservation for change

CF1-EXIT  CF2-MAIN MENU  CF3-RATINGS  CF5-REV BLOCK
           CF10-ADD NEW   CF12-NEXT ACCT  CF20-LIMO
```

Example 4 Select Reservation Screen with an issued comp displaying

*Figure 4D*

```
CFWCB220              BALLY'S LAS VEGAS               Date:  9/17/02
MISSHELBYM         Comp Bank Reinstate Forfeitures    Time: 09:25:35

101 6640678 DOE, JOHN                      Cash Player
            DOB:
                                           Bucket: A A-BUCKET
Sel   Tran    Tr
(X)   Date    Cd  Description              Trans. Amt     Balance
  =   8/27/02 FT  FORFEIT TRANSACTIONS         91.77-          .00

Bottom
F3=Exit                               F8=Bucket
```

*Figure 4E*

UNIVERSAL COMP BANK AND REGIONAL SERVERS FOR USE IN MULTI-PROPERTY CASINO ENTERPRISE

BACKGROUND OF THE INVENTION

In recent years, the casino industry has evolved from being an industry of independent, unaffiliated casino properties to an industry of affiliated casino properties. In some instances, such as Harrah's, all of the casino properties have an identical corporate name and identity. In other instances, such as Station Casinos, Inc. and Park Place Entertainment (PPE), the casino properties have individual names but a single corporate identity (e.g., Palace Station Hotel & Casino, a Station Casinos property, The Flamingo, a PPE property). In yet other instances, independent casino properties have joined with each other to form loose networks with common marketing programs.

Most affiliated casino properties have now instituted player clubs wherein a single player card can be used at any of the affiliated casino properties. The player clubs allows patrons to aggregate comp dollars, cashback awards, and the like, earned at each of the affiliated properties and to make redemptions at any affiliated property. Some player clubs provide kiosks to allow patrons to directly access their account of comp dollars and redeem comp dollars. This type of scheme may be referred to as a "visible comp program." (Comps are complimentary gifts used by casinos to reward players to gamble. Typical comps include free or discounted room, food and beverage, free travel and the like.)

Other player clubs withhold comp account data from the patrons and provide it only to authorized casino personnel. This type of scheme may be referred to as an "invisible comp program." In an invisible comp program, if a player requests a comp at a hospitality desk or by directly asking a host or hostess, the patron's account is reviewed and a discretionary decision is made by casino personnel as to whether a comp can be offered. Upon acceptance of a comp, the casino personnel adjusts the account accordingly.

Individual casino properties also have comp programs that have a visible and invisible component. Earned comp points are apportioned between a visible account that the patron may access at a kiosk, and an invisible account that can only be accessed by authorized casino personnel. Multi-property player clubs such as Harrah's have invisible comp programs that provide both enterprise-level comp accounts and individual property comp accounts.

Visible and invisible comp accounts each have logistical and psychological advantages and disadvantages. A well-designed comp program preferably should include both visible and invisible comp accounts. New logistical issues have arisen as comp programs have moved from individual property and regional approaches to total enterprise approaches.

Despite the proliferation of different types of multi-property player clubs with different visible and invisible components, there is still a need for a more flexible enterprise level, multi-property player club that can maintain visible and invisible components in the same program, minimize the need for communications among properties when checking enterprise-level comp account balances and redeeming enterprise-level earned comps, and still allow individual casino properties within the enterprise to have some degree of autonomy with respect to their comp programs. The present invention fulfills such needs.

BRIEF SUMMARY OF THE INVENTION

A multi-property comp bank is provided which allows comp points to be earned and redeemed in an aggregated manner at a plurality of affiliated casino properties. The comp bank includes two constituents, namely a first bank account of comp points for each casino patron having a balance that is visible to the patron, accessible by the patron, and directly redeemable by the patron, and a second bank account of comp points having a balance that is invisible to the patron, accessible only by authorized casino employees, and redeemable on a discretionary basis only by authorized casino employees. Each award of comp points is apportioned between the patron's first and second bank accounts according to a predetermined ratio. The comp points in the first bank account can be aggregated across properties and redeemed at any property, whereas the comp points in the second bank account can only be redeemed at the property in which they were earned. A plurality of regional computers are provided for implementing the multi-property comp bank. Each regional computer is associated with a predefined number of affiliated casino properties in a particular geographical region. Each regional computer stores bank accounts of comp points for each casino patron of an affiliated casino property who is an active player in the respective region. Upon receiving a comp points balance or redemption request of a patron at one of the affiliated casino properties, the regional computer associated with the affiliated casino property communicates with each of the other regional computers that contains bank accounts for the same patron to obtain the comp points balance for the patron in each of the other regional computers. In this manner, the requesting regional computer thereby obtains the total comp points balance for the patron within the casino enterprise.

BRIEF DESCRIPTION OF THE DRAWINGS

The above summary, as well as the following detailed description of a preferred embodiment of the invention, will be better understood when read in conjunction with the following drawings. For the purpose of illustrating the invention, the drawings show embodiments that are presently preferred. It should be understood that the invention is not limited to the precise arrangements and instrumentalities shown. In the drawings:

FIG. 2 shows an overview of the data elements in a patron identity server populated with sample data to illustrate its function, in accordance with one preferred embodiment of the present invention;

FIG. 3 shows an overview of the data elements in a patron comp bank populated with sample data to illustrate its function, in accordance with one preferred embodiment of the present invention;

FIGS. 4A-4E show sample display screens for one preferred embodiment of the present invention.

DETAILED DESCRIPTION OF THE INVENTION

Figure 1:
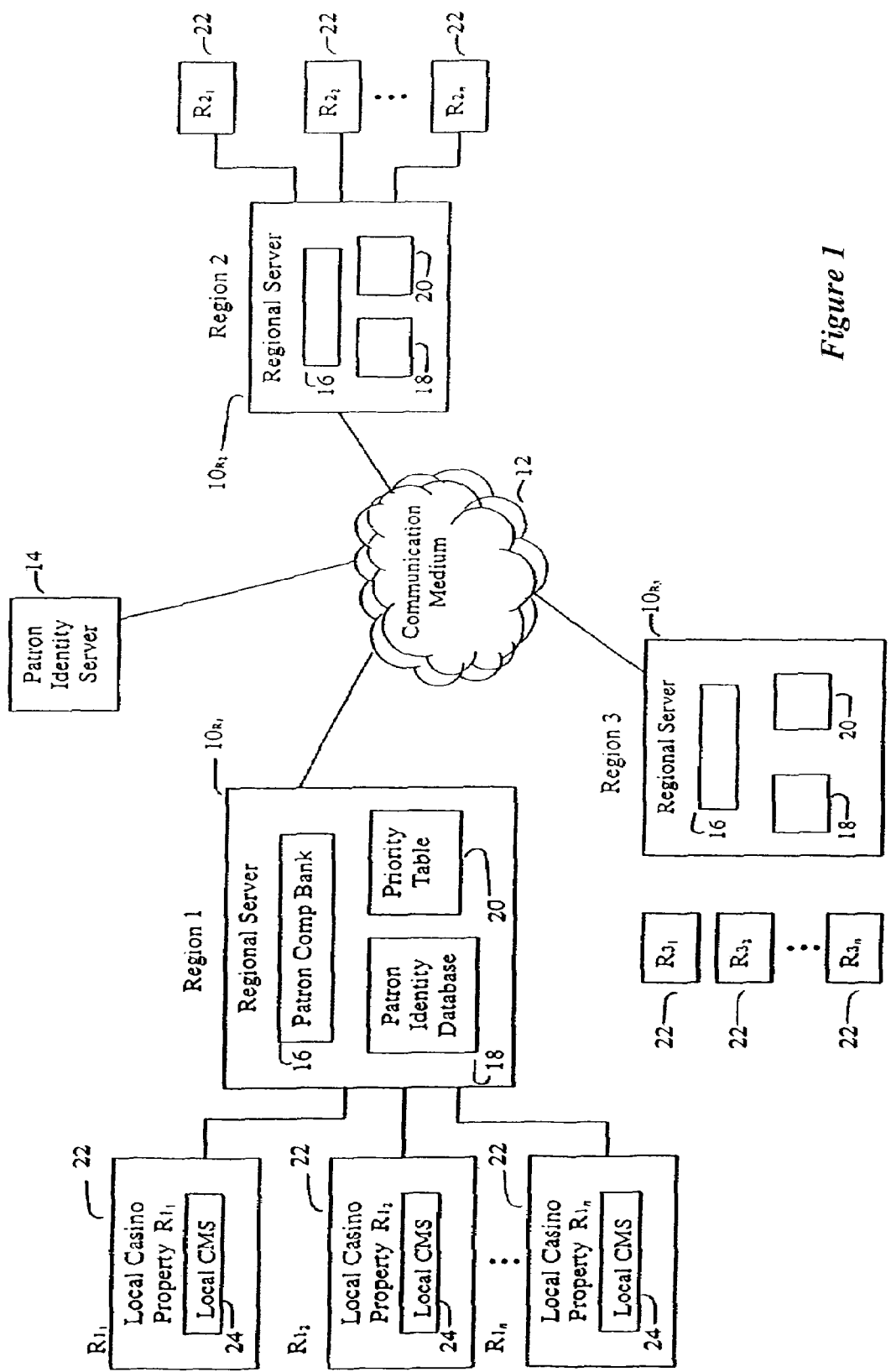
FIG. 1 shows a block diagram of a network of regional servers for implementing a universal comp bank in accordance with one preferred embodiment of the present invention.
Figure 5:
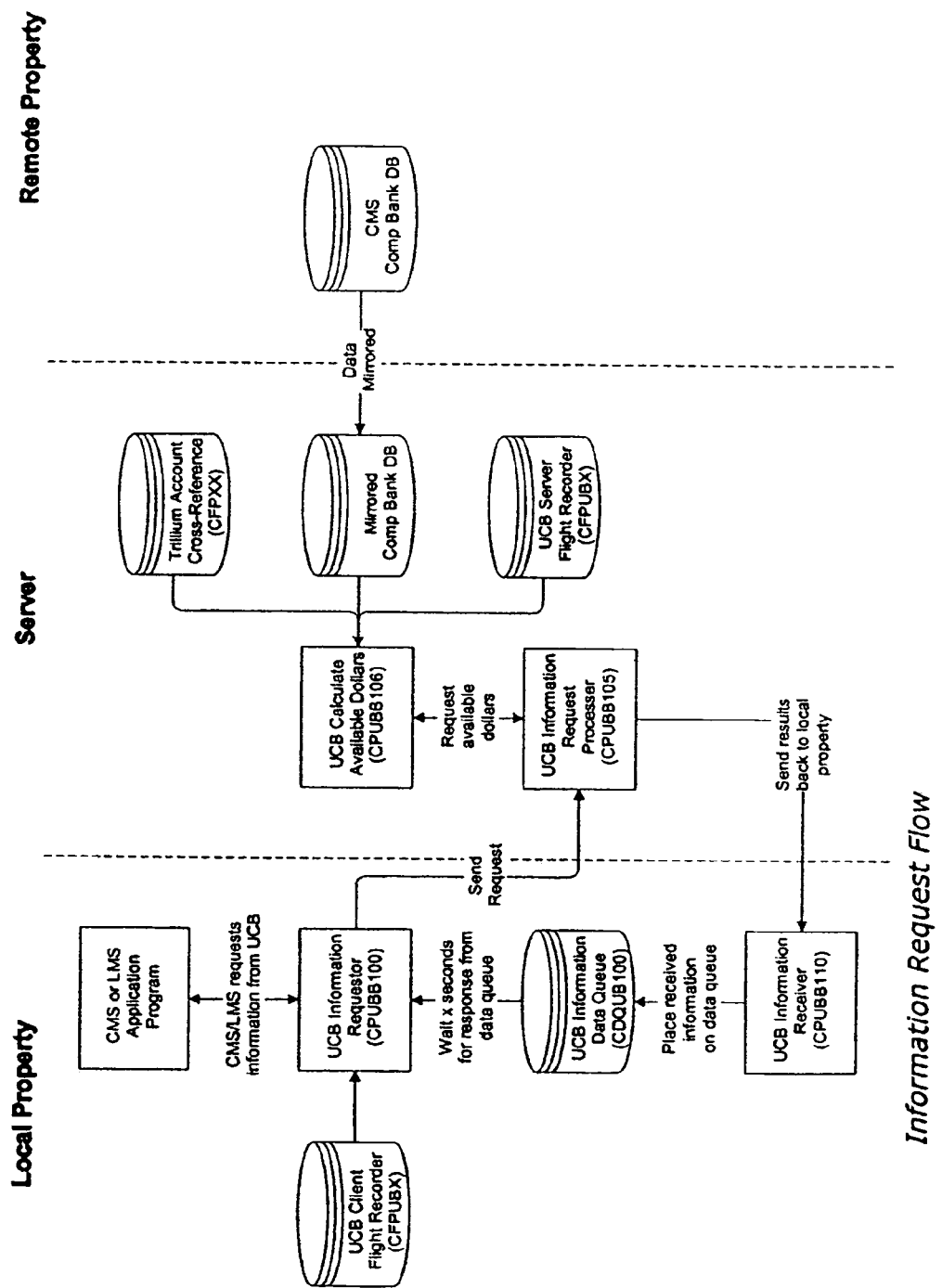
FIGS. 5-8 show detailed system diagrams for one preferred embodiment of the present invention.
Figure 6:
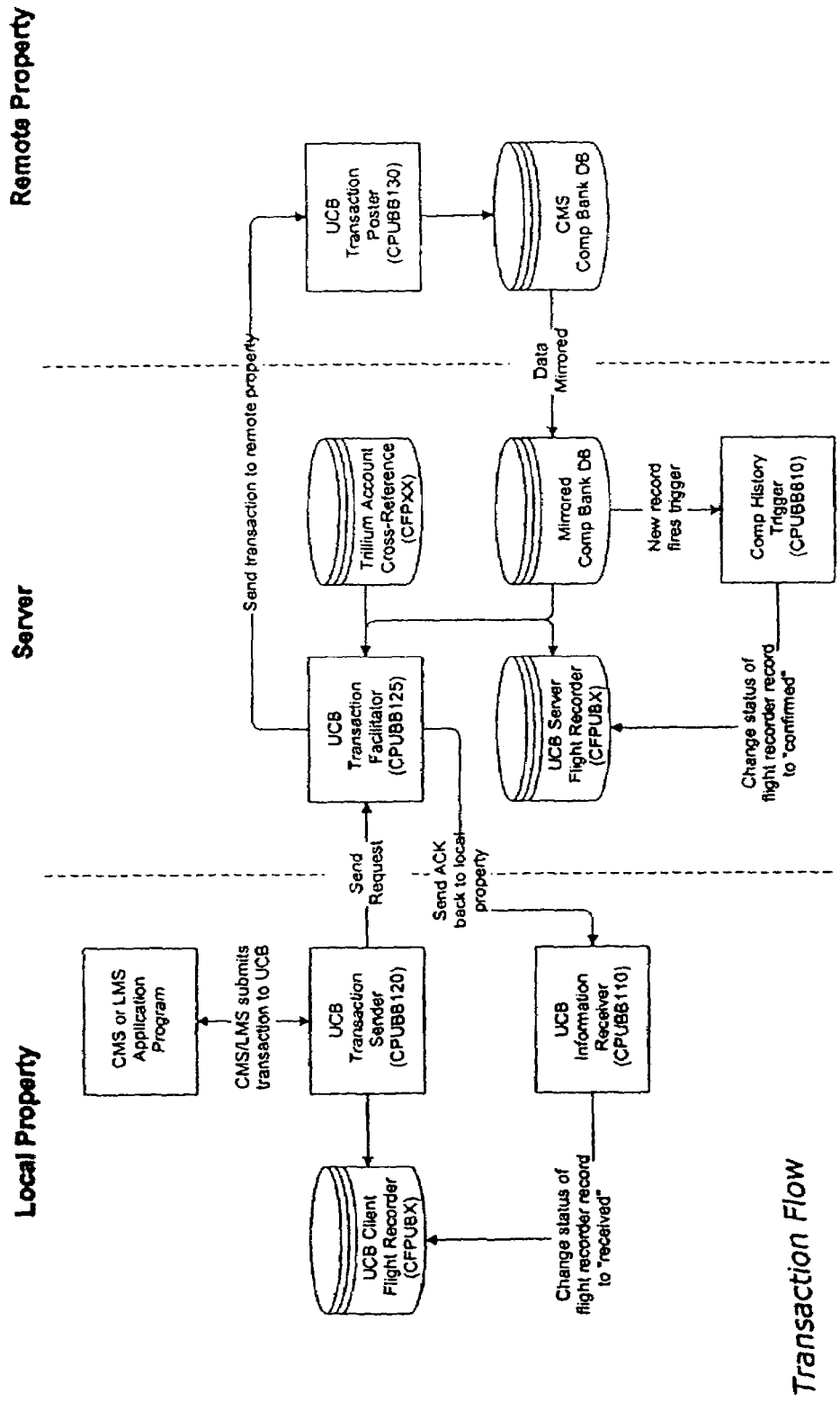
Figure 7:
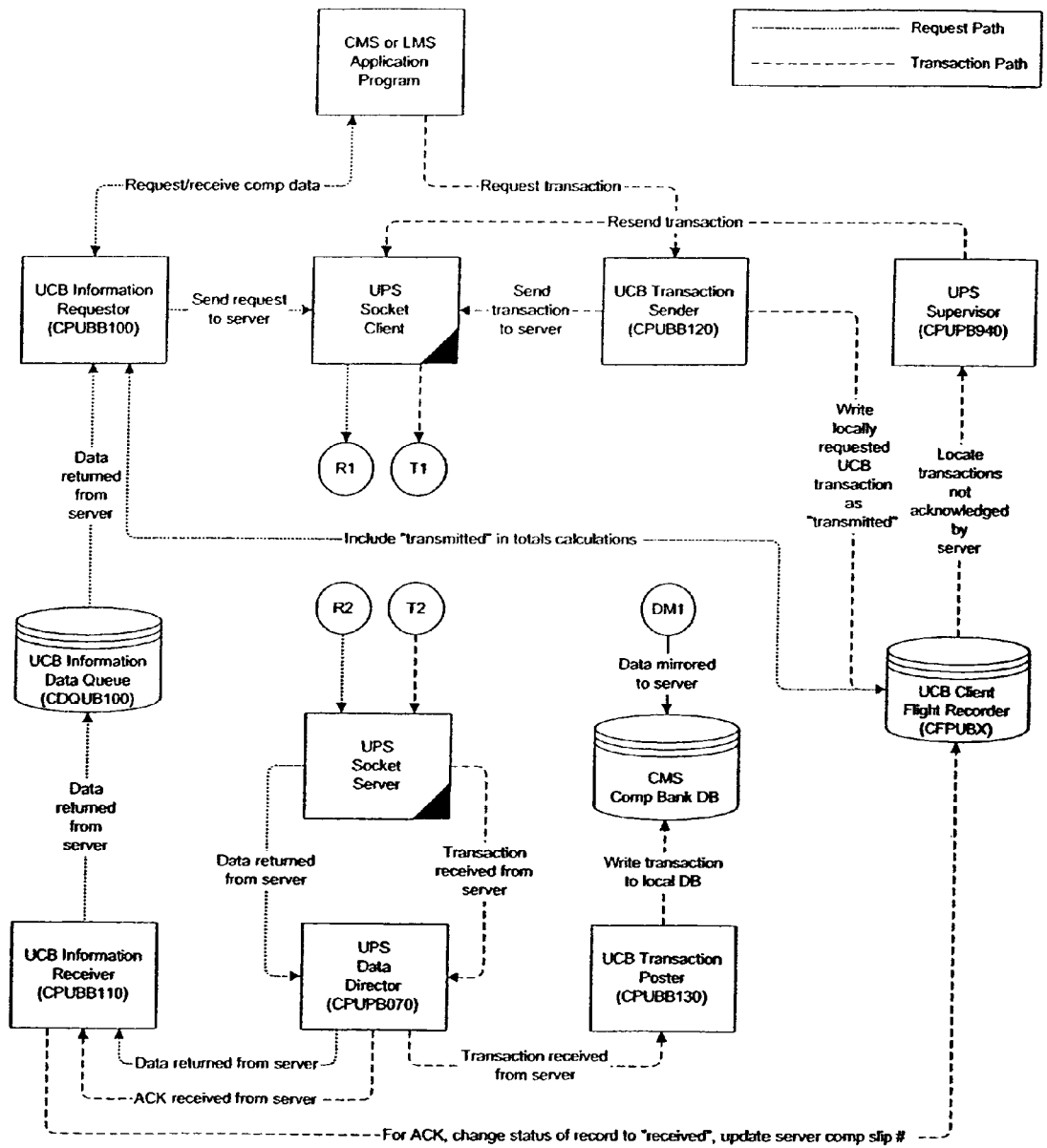
Figure 8:
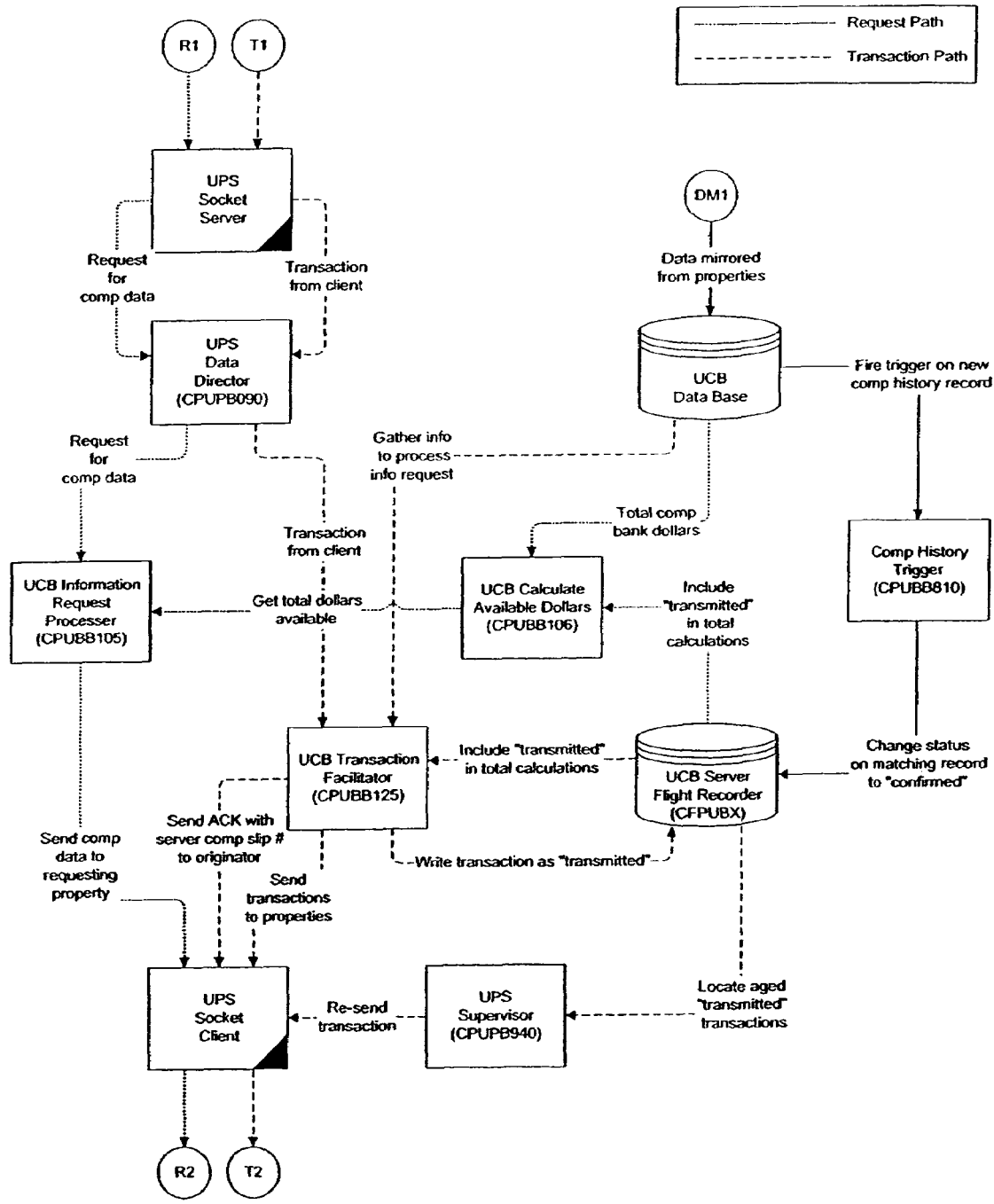

Certain terminology is used herein for convenience only and is not to be taken as a limitation on the present invention.

In the drawings, the same reference letters are employed for designating the same elements throughout the several figures.

1. Overview of Present Invention

A first embodiment of the present invention allocates awarded comp points to casino patrons of a casino enterprise having a plurality of affiliated casino properties. Each comp point has a predetermined dollar value, such as $1.00. Each casino patron has an account number. To implement the first embodiment, a first bank account of comp points is provided for each casino patron account number. The balance of the first bank account is visible to the patron, accessible by the patron, and directly redeemable by the patron. A second bank account of comp points is provided for each casino patron account number. The balance of the second bank account is invisible to the patron, accessible only by authorized casino employees, and redeemable on a discretionary basis only by authorized casino employees. Patron comp points are awarded for selected gaming activity at any affiliated property of the casino enterprise. For each award of comp points, the awarded comp points are apportioned between the patron's first and second bank accounts according to a predetermined ratio. The comp points in the first bank account are redeemable on a multi-property basis, whereas the second bank account of comp points are accumulated and redeemable only on an individual property basis.

The comp points awarded for at least some gaming activity are preferably awarded based on theoretical win for the gaming activity or a percentage of the total dollars spent on the gaming activity. Comp points may also be awarded for selected non-gaming activity at any affiliated property of the casino enterprise. The point balance in the first bank account preferably cannot become negative, but the point balance in the second bank account preferably is allowed to become negative.

A second embodiment of the present invention stores, tracks and redeems awarded comp points of casino patrons of a casino enterprise having a plurality of affiliated casino properties. The comp points are redeemable on a multi-property basis. Each point has a predetermined dollar value. Each casino patron has an account number. To implement the second embodiment, each affiliated casino property is associated with a predefined geographical region. A plurality of regional computers are provided. Each regional computer is associated with one of the predefined geographical regions. Preferably, each affiliated casino property has a local casino management system (CMS) connected to its respective regional computer. Each regional computer stores bank accounts of comp points for each casino patron of an affiliated casino property who is an active player in the respective region. Awarded comp points are posted to patron bank accounts in the regional computer associated with the affiliated casino property where the comp points were earned. Upon receiving a comp points balance or redemption request of a patron at one of the affiliated casino properties, the regional computer associated with the affiliated casino property communicates with each of the other regional computers that contains bank accounts for the same patron to obtain the comp points balance for the patron in each of the other regional computers. The requesting regional computer thereby obtains the total comp points balance for the patron within the casino enterprise. Preferably, only the comp points balance information and the oldest earned point date stored at the other regional computers is communicated to the requesting regional computer. Upon receiving a comp points redemption request, the requested comp points are redeemed from the comp points balance at one or more of the patron bank accounts upon confirmation that the total comp points balance within the casino enterprise is not less than the redemption request. The comp points balance is then updated at the one or more patron bank accounts.

When a patron is actively playing at an affiliated casino property associated with a region, no record locking occurs with respect to the casino patron's bank accounts at other regional computers. In this manner, simultaneous play of the same patron account number is allowed to occur at affiliated casino properties in different geographic regions.

Each local patron account number may be assigned a universal patron identifier number (UID), and each UID may have more than one local patron account number. If so, at each regional server, a record is maintained of which UBD's exist in each of the other regional servers. Inter-regional communications occur only with the regional computers that contain UID's of the patron requesting the comp points balance or comp points redemption.

2. Detailed Description

FIG. 1 shows a block diagram of a network of regional servers 10 ($10_{R1}$, $10_{R2}$, $10_{R3}$) for implementing a universal comp bank in accordance with one preferred embodiment of the present invention. Each regional server 10 may communicate with each other via communication medium 12, which may be any form of wired or wireless medium, including Internet connections. Each regional server may also communicate with an enterprise-level patron identity server 14, as discussed in more detail below. Each regional server includes a patron comp bank 16, a patron identity database 18, and a priority table 20. Each regional server is in real-time or near real-time communication with one or more local casino properties 22. Each local casino property 22 has its own local casino management system 24.

The patron identity server 14 is similar to the patron identity server described in copending U.S. application Ser. No. 10/188,154, filed Jul. 1, 2002, entitled "Local Casino Management System Populating and Updating Process," now U.S. Patent Application Publication No. 2004/0002388, published Jan.1, 2004, which is incorporated by reference in its entirety.

FIG. 2 shows an overview of the data elements in the patron identity server 14 populated with sample data to illustrate its function. The patron identity server 14 includes every universal patron identifier number (UID) assigned to a local account number, and the related locally assigned patron account number and patron identifying information for each of the UID's. The patron identity server 14 further includes a field indicating which of the local casino properties 22 have a patron record that matches the locally assigned patron account number. The data elements in the patron identity server 14 are periodically sent to each of the regional servers 10 and stored in the patron identity database at each regional server 10. Each regional server 10 also includes information (not shown) regarding which regions are associated with each local casino property. This information may be contained within the patron identity database 18, or elsewhere in the regional server 10. In this manner, each regional server 10 may independently determine which other local casino properties 22 have data records for a respective patron, and thereby avoid unnecessary communications with other regional servers 10 which do not contain any information regarding a particular patron when a comp point balance lookup or redemption is requested.

FIG. 3 shows an overview of the data elements in a patron comp bank 16 populated with sample data to illustrate its function. The example of FIG. 3 shows the patron comp bank 16 in the regional server $10_{R1}$ of region 1. Also, in this example, region 1 has only two local casino properties, $R1_1$ and $R1_2$. The patron comp bank 16 includes comp points for only the patrons that are active in region 1. For example, region 1 may include all properties west of the Mississippi river. Patron 1234 who lives in Madison, Wis., and patron 1889 (also, the same as patron 0437) who lives in Austin, Tex. both frequent casino properties in region 1, and thus both are present in the region 1 patron comp bank 16. Patron 1667 is a New York resident and has not yet visited a region 1 casino property. The comp bank account for patron 1667 will be present in one or more of the other regional comp banks 16.

FIG. 3 also illustrates some additional features of the present invention. The comp bank has at least two components, a first bank balance of visible, cross-property earned and redeemable comp points (also, referred to interchangeably as Bank A or Bucket A), and a second bank balance of patron invisible comp points (also, referred to interchangeably as Bank B or Bucket B) which are preferably earned and redeemed only on an individual property basis. In this example, visible and invisible points are earned using a 2:1 ratio (i.e., for every earned point, ⅔ of the point is credited to Bank A and ⅓ of the point is credited to Bank B).

Patron 1234 is active at both local casino properties and has earned 30 comp points at local casino property $R1_1$ (divided up 20/10 between Bank A and Bank B) and 60 comp points at local casino property $R1_2$ (divided up 40/20 between Bank A and Bank B), and has never redeemed any comp points. Patron 1889 is only active at local casino property $R1_1$ and has also earned 30 comp points at local casino property $R1_1$ (divided up 20/10 between Bank A and Bank B). Patron 1889 has redeemed all of the patron visible Bank A comp points, but has not redeemed any of the patron invisible comp points, either because the patron has not requested any comps above and beyond what the patron was allowed to spend in the visible comp bank account, or because a request for comps above and beyond that amount was denied by casino personnel. (Casino personnel have discretion in redeeming the invisible comp points.) Patron 0437 is also only active at local casino property $R1_1$ and has earned at least 30 comp points. The local casino property $R1_1$ has redeemed all of the at least 10 invisible comp points previously earned by patron 0437. The local casino properties may redeem invisible comp points even if the patron has unredeemed visible comp points.

The priority table 20 defines the rules regarding how cross-property (Bank A) comp points are to be taken from each of the regional servers when a redemption request is made for Bank A comp points.

One preferred set of inter-regional order of redemption rules uses a first-in, first out (FIFO) redemption scheme, as described in the appendices below. A strict FIFO redemption scheme would require a significant amount of communications among the regional servers 10 because the date earned of each comp point would have to be associated with each comp point and communicated to the regional server 10 during a points redemption process. The redeeming regional server 10 may need to take points from a plurality of different other regional servers 10, which, in turn, would then have to perform their own reconciliations. To lessen the complexity of the redemption process, a modified FIFO order of redemption scheme may be used, as follows:

1. The date earned of each comp point is individually stored as described in the appendices.

2. When regional servers 10 receive a request for their total comp points from a requesting regional server 10, the date of the oldest point stored at each regional server 10 ("oldest earn date") is returned with the total comp points.

3. The requesting regional server 10 identifies the regional server 10 having the oldest earn date and reviews its inter-regional priority scheme.

4. If the inter-regional priority scheme for the redeeming regional server 10 gives the same priority to all regions (i.e., same "order of redemption"), then comp points are redeemed first from the points of the regional server 10 having the oldest earn date. If there are remaining points to be redeemed, redemptions occur from the regional server 10 having the next oldest earn date, and so on. While this scheme may cause some comp points to be redeemed out of the order in which they were earned, on the average and over the long run, this scheme will provide a redemption order close to a FIFO scheme while significantly reducing the amount of inter-regional communications and data processing steps that must be performed by the redeeming regional server 10.

Another set of inter-regional rules is to first redeem comp points from patron bank accounts in the regional server associated with the affiliated local casino property that initiated the redemption request or which will be providing the item or service in exchange for the points redemption, and then second redeem comp points from bank accounts in the next closest regional server. For example, a west coast regional server 10 may specify that west coast points are to be used first, followed by east cost points (from an east coast regional server 10), and then mid-south points (from a mid-south regional server 10).

Each regional server 10 may have its own inter-regional priority scheme. Thus, one regional server 10 may have an equal priority scheme as described above, whereas another regional server 10 may follow a specific regional priority rule.

Each regional server 10 also includes rules regarding how to allocate point redemptions among the individual local casino property accounts of a redeeming patron for bank accounts within the region. One preferred set of inter-regional rules is to redeem based on a strict FIFO basis, or on a modified FIFO basis as described above. Another set of intra-regional rules is to first redeem comp points from the patron bank account in the regional server of the local casino property associated with the affiliated local casino property that initiated the redemption request or which will be providing the item or service in exchange for the points redemption, and then second redeem comp points from bank accounts in the other local casino properties in the regional server on a proportional basis. Intra-regional rules are not as critical as inter-regional rules, since no regional server communications are necessary for this process. The intra-regional rules also lessen the communication load on the process since the regional computers 10 do not need to communicate with each other to allocate points among their own local properties. For example, if the west coast regional server 10 needs to take 100 points from patron accounts in the east coast regional server 10, the communication message from the west coast server to the east coast server merely consists of the information "Send me 100 points," and the reply is simply "Here are 100 points." Likewise, the return reply is simply, "I took the 100 points. Subtract them from your patron account(s)." The points allocation that occurs in the east coast server and the reconciliation and points allocation in the west coast server can then be performed offline.

Each regional server 10 may have its own intra-regional allocation rules. The scope of the present invention includes other possible inter-regional priority rules and intra-regional allocation rules.

When a patron at a local casino property 22 requests a comp point balance (either in anticipation of a redemption, or merely to find out what the current balance is), the following steps occur:

1. The regional server 10 associated with the local casino property 22 accesses its patron comp bank 16 and tallies up all of the Bank A comp points in each of the local casino properties 22 associated with the regional server 10.
2. The regional server 10 also queries the patron identity database 18 to identify any other regional servers 10 that have patron records associated with the requesting patron. If any are identified, then the regional server 10 communicates with the other regional servers 10, and each of the other regional servers 10 sends back a Bank A comp point total from its respective patron comp bank 16.
3. The requesting regional server 10 tallies up all of the comp points, including its own, and presents a single available comp point total to the patron.
4. If the patron immediately thereafter requests a redemption of points that does not exceed the available total, then the redemption is processed using the priority table rules as discussed above.

If the patron at a local casino property 22 makes a subsequent request for a comp point balance (either in anticipation of another redemption, or merely to find out what the latest current balance is), the steps described above are repeated. The current available comp point total is not permanently stored. However, in one alternative embodiment, if the subsequent request occurs almost immediately after the previous request, it is presumed that the total Bank A comp point total has not changed since the last request. Therefore, the previously calculated available comp point total is used and steps 1-3 are not repeated.

If the patron is requesting a balance or redemption from a location other than a local casino property 22 that is always in near instant communication with its regional server 10 (e.g., a remote kiosk, a telephone, a browser), then another server (not shown) takes over the communication and processing functions of the regional server 10. Alternatively, all such off-property requests may be automatically routed to a specific regional server 10 for processing.

In an alternative embodiment of the present invention, Bank A comp points are constantly aggregated at each regional server 10, and only a single aggregated value is stored, instead of being kept separately for each local casino property 22. In this manner, the balance or redemption request can be simplified since the total number at each regional server 10 is precalculated and no allocation has to occur among individual property bank accounts held in the same regional server as part of a redemption process. However, it may still be necessary to communicate with other regional servers 10 to obtain a total, cross-property enterprise-level Bank A comp point total.

In one preferred embodiment of the present invention, the Bank B comp points are earned and redeemed only an individual property basis, and thus separate Bank B comp point accounts for each local property must be maintained for each patron. This scheme allows patrons and local casino properties 22 to develop and maintain a personalized relationship, since each local casino property 22 will be able to personally reward a local casino patron with hidden comps that cannot be offered by other casino properties within the same enterprise. Furthermore, the local casino property 22 may optionally be provided with the discretion to allow Bank B points to go negative, thereby allowing the local casino properties to make personal assessments and take personal risks on particular casino patron that the local properties deems is worthy of such a risk. In an alternative embodiment of the present invention, the bank account balance of cross-property (Bank A) points may also be allowed to go negative.

As discussed above, comp points may be awarded for gaming and non-gaming activity. The comp points awarded for gaming activity are awarded based on theoretical win for the gaming activity or a percentage of the total dollars spent on the gaming activity. For certain gaming activity, these comp points will be the same. However, these comp points may differ for selected gaming activity, such as when the hold on a slot machine differs from the preset ratio of dollars spent to comp points earned. Comp points may also be awarded for selected non-gaming activity at any affiliated property of the casino enterprise, such as food and beverage purchases, merchandise (retail) purchases, show ticket purchases, and other non-gaming services provided by the casino enterprise. Comp point awarding and redemptions may also be tied into enterprise-level promotions in the same manner as cashback program promotions.

The comp points awarded for non-gaming activity may be treated in two different ways. In one scheme, the non-gaming comp points may be apportioned between the visible and invisible bank accounts in the same manner as the gaming activity comp points. In another scheme, the award of comp points for non-gaming activity may be placed entirely in the first bank account. The patrons may be informed via promotional materials that all non-gaming activity will result in a cashback-type award of comp points. For example, 2% of the value of all non-gaming money spent will be automatically deposited into the patron-accessible comp bank.

In an alternative embodiment, the comp points awarded for non-gaming activity are restricted to preferred patrons (e.g., patrons whose overall gaming activity exceed a pre-determined threshold, and/or who have attained a predetermined status within the casino enterprise, such as a bronze, silver or gold status). In this alternative scheme, the comp points are not immediately credited to the patron's account, but instead are posted to the patron's account at selected intervals.

Inter-regional server communications for comp point balance inquiries and redemptions are preferably limited to comp point values only. Patron activity data, such as detailed ratings information, are preferably not communicated during such inquiries and redemptions. In this manner, the volume of communicated data is kept to a minimum.

The use of regional servers for maintaining comp accounts in the specific configuration described herein allows a single account to be active in multiple regions. Due to the manner in which comp point balance inquiries and redemptions are handled, there is no need to lock patron records across the enterprise. Other enterprise-level casino management systems that rely on a single, central database for maintaining comp accounts may need to lock a patron account if the patron is active at one property, thereby preventing another patron (e.g., a spouse or family member) from using the same account at the same time at another local property.

Points in the universal comp bank may be redeemable for retail purchases in some regions.

The universal comp bank described above may coexist with other promotion schemes of the casino enterprise, such as a cashback program. In this manner, patrons may earn both comps and cash for gaming activity, as well as comps for non-gaming activity.

The following three appendices provide a detailed disclosure of one preferred commercially viable implementation of the present invention. This implementation is described in the following appendices at three different levels, namely, an overview level (Appendix A), an applications specifications level (Appendix B), and a programming specifications level (Appendix C). The discussion of "Trillium" files in the appendices is best understood in view of the disclosure in the copending U.S. application Ser. No. 10/188,154 discussed above. (Trillium Software® is a commercially available product. Trillium Software is a division of Harte-Hanks, Billerica, Mass. Other identity matching software that perform the same functions as the Trillium Software may be used as well and are within the scope of the present invention.) The preferred embodiments described in the appendices refer to an implementation of the present invention for casino properties affiliated with Park Place Entertainment. Some of the documentation is described in the context of changes that were made to a prior art multi-property points accumulation and redemption program. In that program, there was only one regional point server connected to a plurality of regionally located casino properties, and all points were maintained in a single universal comp bank. In contrast to this prior art scheme, the present invention apportions comp points into visible and invisible buckets, and further provides for a plurality of regional point servers that communicate with each other in a specific manner to minimize the number and volume of inter-regional communications.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of allocating awarded comp points to casino patrons of a casino enterprise having a plurality of affiliated casino properties, each comp point having a predetermined dollar value, each casino patron having an account number, the method comprising:
   (a) providing a first bank account of comp points for each casino patron account number, the balance of the first bank account being visible to the patron, accessible by the patron, and directly redeemable by the patron, the comp points in the first bank account being redeemable on a multi-property basis;
   (b) providing a second bank account of comp points for each casino patron account number, the balance of the second bank account being invisible to the patron, accessible only by authorized casino employees, and redeemable on a discretionary basis only by authorized casino employees, the comp points in the second bank account being redeemable only on an individual property basis;
   (c) awarding a patron comp points for selected gaming activity at any affiliated property of the casino enterprise; and
   (d) for each award of comp points, apportioning the awarded comp points between the patron's first and second bank accounts according to a predetermined ratio.

2. The method of claim 1 wherein step (c) further comprises awarding a patron comp points for selected non-gaming activity at any affiliated property of the casino enterprise; and step (d) further comprises for each award of comp points for selected non-gaming activity, placing the entire awarded comp points in the first bank account.

3. The method of claim 2 wherein comp points awarded for non-gaming activity are restricted to preferred patrons.

4. The method of claim 1 wherein the comp points awarded for at least some gaming activity are awarded based on theoretical win for the gaming activity.

5. The method of claim 1 wherein the comp points awarded for at least some gaming activity are awarded based on a percentage of the total dollars spent on the gaming activity.

6. The method of claim 1 wherein the point balance in the first bank account cannot become negative, and the point balance in the second bank account is allowed to become negative.

* * * * *